United States Patent [19]

Jones et al.

[11] Patent Number: 4,881,956
[45] Date of Patent: Nov. 21, 1989

[54] METHOD AND DEVICE FOR CLEANING PARTICULATE-LADEN GASES

[75] Inventors: Dale G. Jones; Henry H. Elliott, both of Visalia, Calif.; Lawrence R. Lepouitz, Inglewood, Col.

[73] Assignee: J. Edwards Enterprises, Visalia, Calif.

[21] Appl. No.: 22,476

[22] Filed: Mar. 6, 1987

Related U.S. Application Data

[63] Continuation of Ser. No. 760,362, filed as PCT US83/00394 on Mar. 18, 1983, published as WO84/03641 on Sep. 27, 1984, abandoned.

[51] Int. Cl.⁴ .......................................... B01D 47/00
[52] U.S. Cl. .......................................... 55/84; 55/230
[58] Field of Search .................. 55/84, 91, 94, 223, 55/230; 261/88–90, 84

[56] References Cited

U.S. PATENT DOCUMENTS

| | | | |
|---|---|---|---|
| 1,691,827 | 11/1928 | Schucker | 261/88 |
| 1,848,945 | 3/1932 | Genter | 261/89 |
| 2,607,575 | 8/1952 | Hession, Jr. | 261/90 |
| 3,016,979 | 1/1962 | Schmid | 55/230 X |
| 3,020,974 | 2/1962 | Hungate | 55/230 |
| 3,194,544 | 7/1965 | Jamison et al. | 55/230 X |
| 3,250,473 | 5/1966 | Hege | 239/7 |
| 3,346,192 | 10/1967 | Hege | 239/223 |
| 3,693,326 | 9/1972 | Deane | 55/230 |
| 3,861,891 | 1/1975 | Noguchi et al. | 55/230 |
| 3,885,918 | 5/1975 | Isahaya | 23/284 |
| 3,887,133 | 6/1975 | Staarup et al. | 239/224 |
| 3,932,587 | 1/1976 | Grantham et al. | 423/242 |
| 3,948,608 | 4/1976 | Weir, Jr. | 23/284 |
| 3,966,878 | 6/1976 | Pausch et al. | 423/242 |
| 3,971,641 | 7/1976 | McNamara | 55/230 X |
| 3,998,612 | 12/1976 | Lundy | 55/230 X |
| 4,242,109 | 12/1980 | Edwards | 55/230 |
| 4,544,379 | 10/1985 | Elliott et al. | 55/71 |

FOREIGN PATENT DOCUMENTS

| | | | |
|---|---|---|---|
| 846076 | 7/1970 | Canada | 55/84 |
| 1256237 | 6/1968 | Fed. Rep. of Germany . | |
| 105666 | 9/1924 | Switzerland | 261/90 |

OTHER PUBLICATIONS

Degani, D. D. et al., "Intertial Deposition of Small Particles on a Sphere at Intermediate and High Reynolds Numbers: A Time Dependent Study". Journal of the Air Pollution Control Association, vol. 31, No. 9, (Sep. 1981), p. 981–986.

Primary Examiner—Bernard Nozick
Attorney, Agent, or Firm—Townsend and Townsend

[57] ABSTRACT

An improved rotary spray scrubber of the type including an elongate gas flow duct and a rotary dispersion hub is described. The improvement comprises maintaining the ratio of the hub diameter to the duct diameter in the range from about 0.55 to 0.75. The improved rotary scrubber is particularly effective at removing submicron particulates from a gas stream, with removals well above 90% being feasible.

8 Claims, 4 Drawing Sheets

METHOD AND DEVICE FOR CLEANING PARTICULATE-LADEN GASES

BACKGROUND OF THE INVENTION

1. Field of the Invention

This is a continuation of application Ser. No. 760,362, filed as PCT US83/00394 on Mar. 18, 1983, published as WO84/03641 on Sep. 27, 1984, now abandoned.

The present invention relates generally to the removal of particulates from a flowing air stream, and more particularly to the removal of submicron particles using a rotary spray scrubber.

The collection of submicron particles is problematic. While conventional collection technologies, such as electrostatic precipitators, venturi scrubbers, and baghouses, are capable of relatively high collection efficiencies, the utilization of each of these methods suffers from drawbacks. Electrostatic precipitators require constant adjustment of the operating voltage level for efficient collection of submicron particles. Venturi scrubbers incur very high energy costs in fan pressure drop requirements to achieve an acceptable collection efficiency. Finally, the bag filters in baghouses quickly become plugged with very fine particulates (particularly with oil-based smoke particles which stick to the cloth filters) and must be frequently replaced at a substantial cost.

Conventional water scrubbers rely on the physical impaction of the particulates in an air stream with water droplets to remove the particles from the air stream. The collection efficiency of water scrubbers increases when the amount of liquid is increased or the amount of gas being scrubbed is decreased. Conventional water scrubbers use low pressure pumps (typically 30 psi) with large volumes of water (typically 20 to 40 gal/1000 cfm gas). The scrubbing action is accomplished with large water droplets (1000 to 3000 microns) which move at low speeds (30 to 60 ft/sec). When scrubbing submicron particles, conventional water scrubbers achieve collection efficiencies which are typically lower than 50%, usually between 20% and 30%. While the collection efficiency can be increased by forming much smaller droplets or by further large increases in the amount of water sprayed, these alternatives require either high pressure pumps (3000 to 5000 psi) and/or a large water flowrate. Such additional pumping requirement renders conventional water scrubbers impractical for removing submicron particles because of both high capital costs and high operating costs due to high energy consumption.

For the above reasons, it would be desirable to provide a water scrubbing system for the removal of submicron particulates from a gas stream without excessive requirements for water or energy.

2. Description of the Prior Art

A rotary spray scrubber of the type of the present invention is described in U.S. Pat. No. 4,242,109 to Edwards. The scrubber includes a conduit for directing the particulate-laden gas stream in a first direction. An axial impeller induces flow of the gas through the conduit. A rotary dispersion device attached on a common shaft with the impeller and located immediately downstream thereof directs a spray of droplets into the flowing air stream. The nature of the rotary dispersion device is not discussed in detail in the patent.

Figures 1, 2:
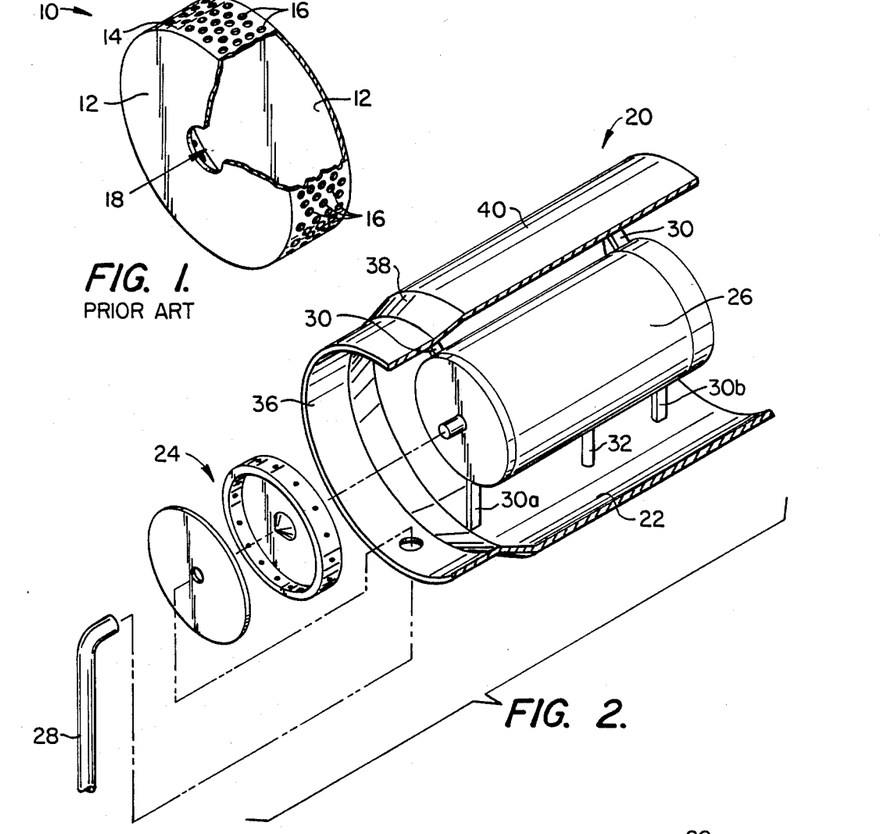
FIG. 1 is an isometric view of the prior art rotary dispersion hub with portions broken away.
FIG. 2 is an exploded isometric view of the gas cleaning module of the present invention with portions broken away.

Certain machines incorporating the teachings of the subject patent have been manufactured and sold by EMCOTEK Emission Control Technology, Visalia, Calif. 93291. The dispersion device employed in these machines is illustrated in FIG. 1 and comprised a six-inch diameter hub 10 including a pair of spaced-apart disks 12 joined by a perforated sheet metal periphery 14. The perforations 10 comprised about 50% of the peripheral surface area. Water was fed into the hub 10 through an opening 18 in one of the disks and the hub rotated to generate a spray. The hubs were placed in conduits (reference no. 15 in the Edwards patent) having a diameter of 18 inches. Using this device, collection efficiencies of submicron particles above 50% could not be achieved.

SUMMARY OF THE INVENTION

The present invention is an improved rotary spray scrubber and method for operating the spray scrubber to remove submicron particles from a flowing stream of gas. The rotary spray scrubber is of the type which includes a cylindrical duct which receives the flow of particulate-laden gas and a rotary dispersion device for directing a generally radial spray of water transverse to the duct and into the air flow. In this way, the particulates are impacted and are removed from the air stream. It has been found that by providing a rotary dispersion hub having a diameter in the range from 0.55 to 0.75 of the duct diameter, collection efficiencies of 90% and higher can be achieved even with submicron particles. Usually, the hub will have a generally circular periphery and a substantially solid radial face covering the entire area within the periphery. Collection efficiencies for particles of greater that one micron in size (and smaller than 0.1 microns) are even higher.

A preferred rotary dispersion hub includes a relatively thick annular lip having a number of radial passages, usually in the range from about 5 to 75, more usually in the range from 8 to 64. Altogether, the cross-sectional area of the passages will be limited to below about 20% of the peripheral surface area of the hub, usually being in the range between about 5 and 15%. Water which is directed through the passages, typically at a low pressure of about 25 psi, is fully accelerated by the rotation of the very small water droplets on the order of 10 to 50 microns are generated, with the exact size depending on the diameter and rotational speed of the hub (i.e., the tangential velocity). Due to the high velocity and large number of these droplets, high particulate collection efficiency can be achieved with much less water than required by prior art scrubbers. Moreover, such generation of the droplets requires much less energy than the corresponding generation by pumping through a nozzle.

DESCRIPTION OF THE PREFERRED EMBODIMENT

The method and system of the present invention are primarily intended to remove submicron particulates, such as smoke and soot, from exhaust gas streams. They work equally well, however, in removing larger particulates and gas-phase contaminants, such as $SO_2$. In the latter case, the liquid scrubbing medium will usually be selected to either react with or physically absorb the gas-phase contaminant. While the remainder of the description will be made in reference to particulate collection from a gas stream (usually flue gas or air) with a water scrubbing medium, the invention includes other contaminants and scrubbing media which can be effective in said method and system.

Figure 3:
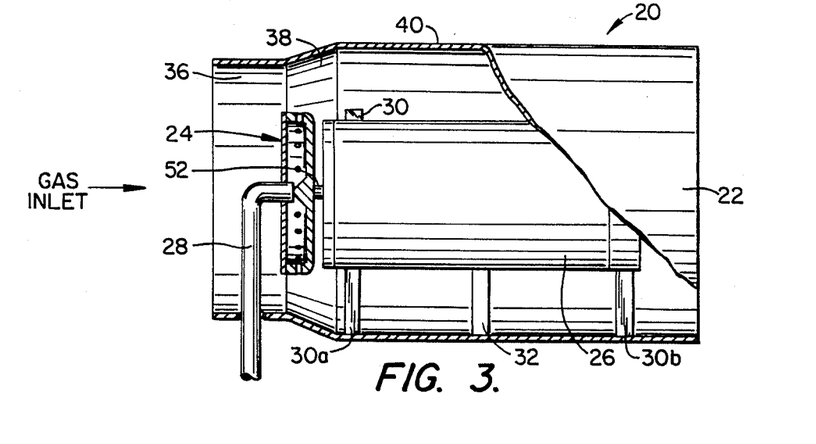
FIG. 3 is a side elevational view of the gas cleaning module of the present invention with portions broken away.

Referring now to FIGS. 2 and 3, a gas cleaning module 20 comprises a generally cylindrical duct 22, a rotary dispersion hub 24, a hub drive motor 26, and a water feed line 28. The motor 26 is mounted on a plurality of struts 30. A pair of the struts 30a and 30b are hollow and used to provide cooling water or cooling air to and from the motor 26. A conduit 32 is further provided for the power (usually electrical) connection for the motor.

The cylindrical duct 22 comprises three sections. The inlet to the duct is a short cylinder 36. The next section is a collar 38 flared outward in the direction away from the inlet cylinder 36, and the remaining portion is a cylinder 40 having a somewhat greater diameter than the inlet cylinder 36. The precise dimensions of the duct 22 are not critical and, for the purposes of the present invention, it is necessary only that the duct diameter bear the proper ratio to the diameter of the rotary dispersion hub 24, as will be discussed in more detail hereinafter.

Figure 4:
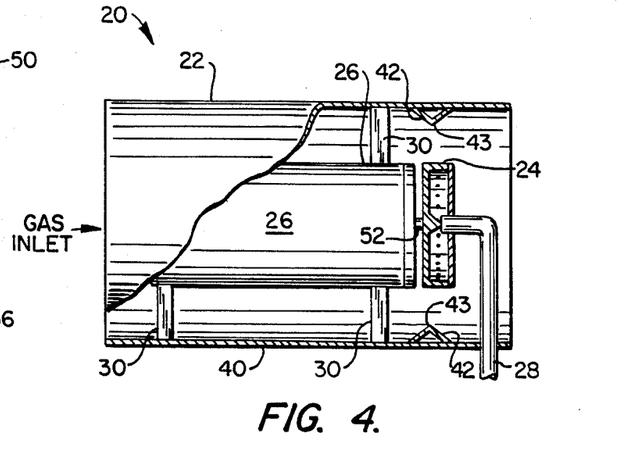
FIG. 4 is a view, similar to FIG. 3, of an alternate embodiment of the gas cleaning module of the present invention.

Referring now to FIG. 4, a second embodiment of the gas cleaning module 20 comprises a cylindrical duct 22 (having a uniform diameter) with the gas inlet side facing the closed end of hub drive motor 26. The gas travels across support struts 30 through the annular space between the motor 26 and the duct 22. A wedge-shaped flow deflector 42 is fixed to the inside wall of cylindrical duct 22, being generally axially aligned with the hub 24. The deflected airflow is scrubbed by high velocity droplets which exit from the rotary dispersing hub 24 in a radial direction. Scrubbing liquid is supplied to the rotary hub 24 by feed line 28. The approximate dimensions of flow deflector 42 are such that the minimum diameter at the apex 43 of the wedge is not less than 90% of the cylindrical duct 22 diameter, usually being from 95 to 90%.

The purpose of the deflector 42 is to deflect the incoming gas stream toward the radial spray. As the spray approaches the interior wall of the duct 22, the spray velocity acquires an increasingly large axial component which diminishes its impaction efficiency. By deflecting the gas at the outer periphery toward the center line of the duct 22, the spray impacts the particulates at closer to a perpendicular approach angle and the collection efficiency is improved.

Figure 5:
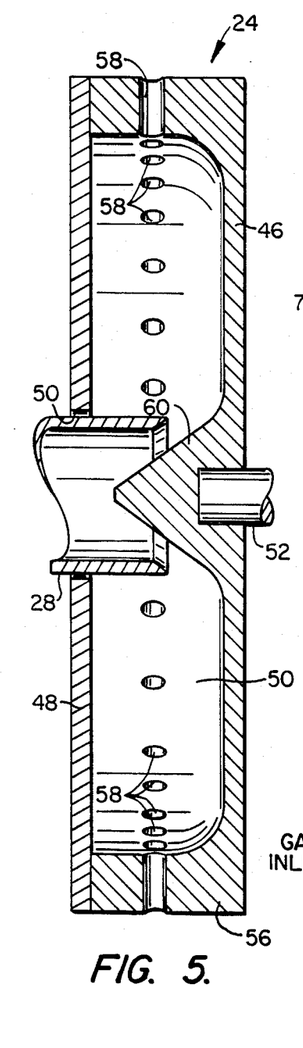
FIG. 5 is a side elevational view of the preferred rotary dispersion hub of the present invention shown in section.

Referring now to FIG. 5, the rotary dispersion hub 24 will be described in detail. The hub 24 comprises a rim member 46 and a cover plate 48 which together define a water-receiving cavity 50. The cover plate 48 has a central opening 50 which receives the distal (open) end of water feed line 28. The rim member 46 is mounted on a shaft 52 driven by the motor 26. The shaft 52 and the portion of water feed line 28 which projects through opening 50 in cover plate 48 are axially aligned so that the feed line 28 does not interfere with rotation of the hub 24.

The rim member 46 includes an annular flange 56 about its periphery, said flange including a plurality of radial passages 58 therethrough. The number of passages 58 may vary widely depending on the diameter and thickness of the hub and on the collection efficiency desired. Arrangement of the passages 58 into a single row including thirty-two holes, which are equally spaced apart about the circumference of the flange 56, has been found suitable for most applications. While the addition of more passages 58, or more rows of passages, may improve the collection efficiency under certain circumstances, the increased water consumption is undesirable. The hub of the present invention usually operates well with a relatively low number of passages, typically from eight to 64, more typically from 16 to 32.

The rim member 46 includes a deflecting cone 60 aligned along its central axis and projecting into the interior cavity 50. In this way, as the water flows in through water feed line 28, it is deflected evenly throughout the entire cavity so that water flow is even in all directions. The system functions when the dispersing hub 34 is oriented vertically, horizontally, or at any inclination in between.

The hub parameters of importance include the hub 24 diameter, the thickness of the annular flange 56, the total number of holes, and the arrangement of holes into discrete rows. The hub diameter must be selected together with the duct diameter to provide sufficient clearance between the hub and the duct to allow the expected flow rate of particulate-laden air. Generally, as the hub diameter increases, the duct diameter will also increase within the specified ratio (i.e., 0.55 to 0.75). This results in an increased annular clearance and larger hub diameters are chosen for higher expected flow rates. The thickness of the annular flange 56 is less critical. It is necessary only that the thickness be sufficient so that the water ejected from each passage 58 is fully accelerated to the tangential velocity of the periphery of the hub 24. This assures that the water will be fully atomized in very small droplets. An annular flange thickness of about one inch is usually sufficient, although greater thickness up to several inches are also useful. The diameter of the individual passages 58 is also not critical. Diameters of from 1/16 to 5/16 of an inch are adequate.

Selection of the optimum diameter ratio between the hub and the outer tube depends on the physical dimensions of the outer tube. The optimum diameter ratio should provide maximum water droplet velocity (VH) relative to the crossflowing air velocity (VT) for a given air flowrate (CFM) and hub rotational speed (RPM). Theoretically, this velocity ratio can be expressed:

$$\left(\frac{VH}{VT}\right) = \left(\frac{RPM}{CFM}\right)\left(\frac{HT^2}{700.3}\right)\left[1 - \left(\frac{H}{T}\right)^2\right]$$

where H is the hub diameter, T is the outer tube diameter, (both in inches), and (H/T) is the critical diameter ratio. If the RPM, CFM and T are constants, then the derivative of the velocity ratio with respect to H is:

$$\frac{d}{dH}\left(\frac{VH}{VT}\right) = 1 - 3\left(\frac{H}{T}\right)^2$$

Setting the derivative equal to zero, the optimum diameter ratio from a theoretical standpoint is:

$$\left(\frac{H}{T}\right) = \left(\frac{1}{3}\right)^{0.5} = 0.577$$

As determined experimentally, the optimum diameter ratio for high efficiency removal of submicron particles varies from 0.55 to 0.75 as the size of the outer tube is increased from about 10 inches to about 48 inches. At the larger tube diameters, it is more important to maintain a relatively narrow scrubbing zone by increasing the diameter ratio than it is to maintain the optimum velocity ratio.

The module 20 of the preferred embodiment (FIG. 4) includes a duct 22 having an inside diameter of 20 inches, a wedge 42 having a diameter at the apex 43 of 18 inches, and a rotary dispersing hub 24 having a diameter of 11 inches. The length of the duct 22 is not critical with an upstream length of about 18 inches and a downstream length of 8 inches being adequate. Such a module is capable of treating from about 2000 to 4000 SCFM, depending on the type of particulate and the degree of removal desired. At 2000 SCFM, approximately 90% of the 0.5 micron particles are removed while substantially all of the 2.5 micron particles are removed. At 4000 SCFM, removal of the 2.5 micron particles drops to about 99%, while removal of the 0.5 micron particles drops to about 80%.

While the dimensions of the module 20 and its components can vary widely, there are practical limits to the size. Modules having a duct in diameter below about 10 inches are incapable of handling the large air flows encountered in most applications. On the other hand, duct diameters on the order of 48 inches require very large hubs on the order 36 inches. While such hubs may be constructed, the power required to achieve efficient particulate removal is excessive. For handling larger air flows, it is desirable to use multiple units of an intermediate size.

Figure 6:
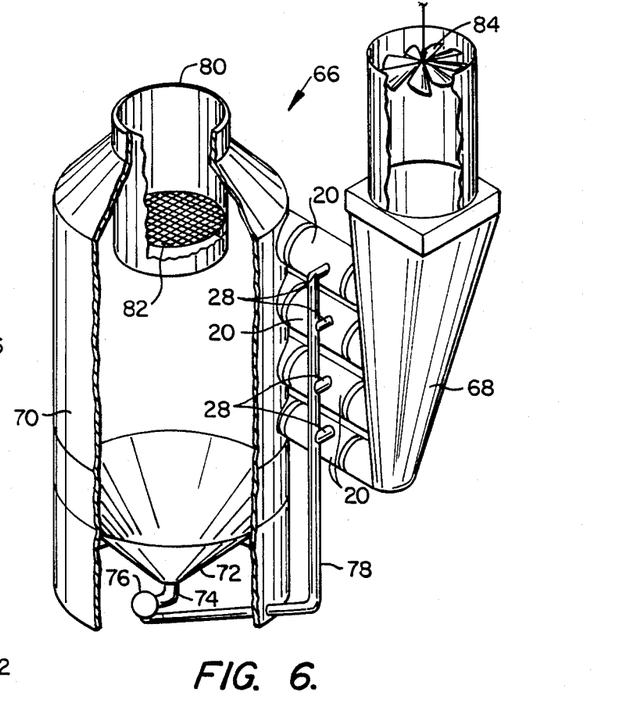
FIG. 6 illustrates a gas cleaning system employing a plurality of the gas cleaning modules of the present invention.

An exemplary unit 66 including four modules 20 is illustrated in FIG. 6. The units share a common distribution manifold 68 and are arranged horizontally to feed into a vertical cyclonic mist eliminating chamber 70. The chamber 70 includes a cone shaped bottom 72 for collecting the water and entrained particulates as they fall downward. A transfer line 74 from the collection cone 72 feeds a recirculation pump 76. Typically, a portion of the recycled liquid will be withdrawn and disposed of to maintain an acceptable level of particulates in the recycled liquid stream. The recycled liquid is directed through a manifold line 78 to the individual water feed lines 28 associated with each of the gas cleaning modules 20. A clean gas outlet 80 is located at the top of the cyclone chamber and a mist eliminator 82 is provided. Optionally, a fan 84 may be provided at either the dirty gas inlet (as illustrated) or the clean gas outlet of the air cleaner to induce the necessary air flow. Conveniently, an axial fan is used, although any type of blower would be adequate.

In operating the gas cleaning modules 20 a number of parameters must be chosen. Even after the dimensions of the unit 20 are selected, the gas flow rate, liquid flow rate and hub RPM must be selected to provide the desired collection efficiency. In general, both higher hub RPM and higher liquid flow rates lead to improved collection efficiency. They, however, both lead to increased energy consumption so it will usually be necessary to optimize both the hub speed and liquid flow rate to provide just the degree of removal desired.

Generally, gas flows in the range from 2 to 65 MCFM can be accommodated, with smaller diameter units finding use at the lower end and larger diameter units at the upper end. The ratio of scrubbing liquid to gas flow will usually be maintained at or above about 2 gpm/MCFM, more usually at or above about 5 gpm/MCFM with an upper limit of about 25 gpm/MCFM, more usually about 10 gpm/MCFM. Increasing the liquid flow above the upper limit results in higher operating costs with only marginal improvement in removal. The hub rotational speed will depend largely on the hub diameter, with the particular RPM chosen to provide a minimum tangential velocity at the hub periphery of 250 ft/sec, more usually 500 ft/sec.

The following experiments are offered by way of example and not by way of illustration.

EXPERIMENTAL

Test System Description

Figure 7:
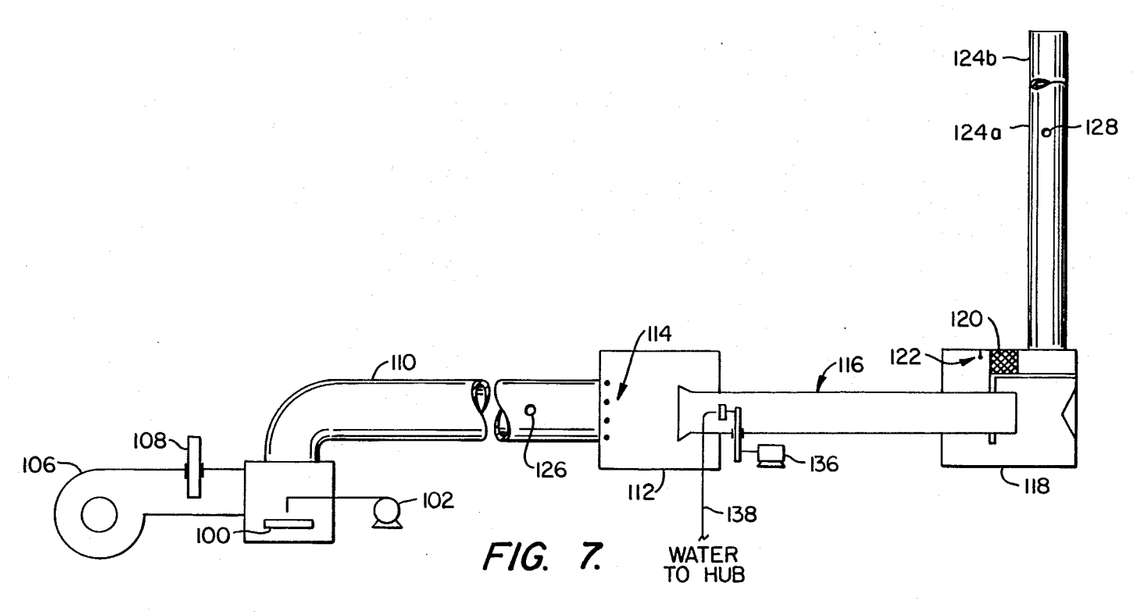
FIG. 7 illustrates the system used in the Experimental section hereinafter.

The test system used in the following experiments is illustrated in FIG. 7. Combustion soot was generated by dripping #2 diesel oil onto an Arrow Hart hot plate 100 heated to approximately 900° F. The flow rate of the diesel oil was regulated by a Cole-Parmer Masterflex variable speed pump 102. By varying the flow rate of diesel oil onto the hot plate 100 and regulating the air flow rate, the particulate concentration could be controlled. The mean particle size of the soot particles so generated was about $0.4\mu$, with a minimum size of about $0.1\mu$ and a maximum size of about $0.8\mu$.

Air flow through the system was provided by a 10 HP, 28 inch centrifugal fan 106 which delivered a maximum flow of 10,000 CFM at 3 inches of water static pressure. Air flow was regulated by a sliding gate 108 immediately downstream of the fan 106. The smoke travelled 20 feet in a 24 inch round duct 110 before entering a plenum chamber 112. Nozzles 114 were provided at the inlet to the chamber 114. Water could be provided through nozzles 114 to saturate the smoke-laden air and reduce the temperature to adiabatic saturation. The smoke then entered a spray scrubbing unit 116, as described in reference to FIG. 8. The cleaned gas then entered a baffled chamber 118 which housed a Heilex-EB four pass mist eliminator 120. Spray nozzles 122 before the mist eliminator 120 prevented reentrainment of particles in the exhaust stream prior to emission out of twin stacks 124a and 124b. The exhaust stacks 124 were 24 inches in diameter and 20 feet tall. Sample ports 126 and 128 were provided four feet upstream of the plenum chamber 112 and the first exhaust stack 124a outlet, respectively. The second exhaust stack 124b housed an opacity meter (not shown) at the same height as sample port 128 on the first exhaust stack.

Figure 8:
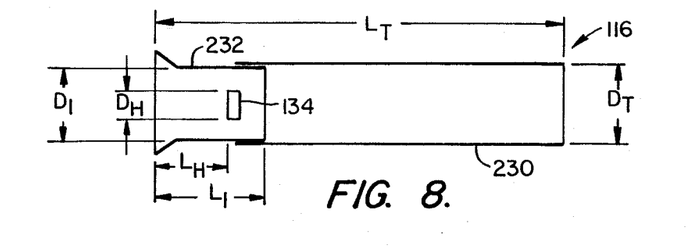
FIG. 8 is a schematic view of a portion of the experimental system of FIG. 7 which illustrates the relative dimensions of the components.

Referring to FIG. 8, the scrubbing unit 116 comprised a cylindrical duct 130 which circumscribed a flared inlet tube 132. The inside diameter ($D_I$) of the inlet tube 132 was 18.5 inches, and the inside diameter ($D_T$) of the duct 130 was 25 inches. A replaceable spray hub 134 was mounted on a drive shaft driven by a 25 HP electric motor 136 (FIG. 7) through a sheave and belt arrangement. The hub speed could be adjusted in the range from 6000 to 13,500 RPM by selecting the ratio of sheave diameters.

Two different types of hubs were employed. The first was a cylindrical screen of the type employed by the EMCOTEK model of the prior art. The second was constructed as described in reference to FIG. 5 hereinabove. Prior art hubs having diameters of 4.5, 7.0 and 9.0 inches were tested, while hubs as described in FIG. 5 having outside diameters of 4.5, 7.0, 9.0, 12.5, and 14.0 inches were employed. Water to hub 134 was supplied through line 138 at a pressure of about 10 psi in all cases.

The collection efficiency was determined by measuring the inlet and outlet particulate concentrations at sample ports 126 and 128, respectively. The sampling rates were adjusted to provide isokinetic sampling. Flowrates were calculated from velocity measurements taken with an S-type pitot tube and a hot-wire anemometer air velocity meter, model 440, manufactured by Kurz. The pitobe assembly, manufactured by Anderson, contained a sampling probe, an S-type pitot tube to measure the gas stream velocity pressure, and a thermocouple temperature sensor to measure the gas stream temperature. The pitobe assembly was followed directly by an inline filter holder, manufactured by Sierra. The sampling line contained a vacuum gauge to measure the probe vacuum pressure, plus a water trap, and a dry gas meter to measure the total volumetric air flow sampled, followed by a rotameter to monitor the gas flow during sampling and culminating with a vacuum pump. A Wager Model P-6 optical transmissometer was used to measure opacity. The opacity sensor was mounted four feet from the top of the second exhaust stack 124b.

Test Procedure

Using the test system just described, tests were run varying the following parameters:
Hub diameter
Hub width
Hub RPM
Water flow rate to hub
Individual tests were performed as follows.

After installing the sheave and belt corresponding to the desired hub RPM, the hub drive motor 136 was turned on. The water flow rate to the hub 134 was then initiated and adjusted while the hub was running until reaching an ammeter reading of 61 amps, corresponding to an output of 25 HP from the motor 136. The water flow rate was measured by using a stopwatch to determine the amount of time needed to fill a five gallon container. Water flow was variable depending on the hub diameter and hub RPM, in order to maintain a constant 25 HP.

Two 102 mm glass fiber filters were weighed to the nearest 0.1 mg and placed in clean labeled glass petri dishes. The filters were kept in the petri dishes except during testing and weighing. During each test, filters were placed in the filter holders of both the inlet and outlet sampling trains, and the filter holders were sealed to prevent leakage.

After establishing water flow to the hub 134, fan 106 and hot plate 100 were turned on. Oil supply pump 102 was then started and adjusted to supply about 0.5 cc/min to the hot plate 100. Sliding gate 108 was positioned to provide a preselected air flow, and the system allowed to reach equilibrium (corresponding to a steady-state value for the opacity reading in the second exhaust stack). This opacity was taken as the inlet opacity. The hub drive was then started, and the system again allowed to reach a steady-state opacity. These values of inlet and outlet opacity are reported in Tables 1 and 2.

As soon as the system reached steady state, the sampling probes were inserted through ports 126 and 128 and into the center, of the gas stream. The probes were positioned so that the nozzle openings were perpendicular to the gas flow. The vacuum pumps were then turned on and the sampling rate was adjusted to achieve isokinetic sampling. The initial temperature, velocity and vacuum pressures, and opacity readings were recorded. The gas stream temperature and probe vacuum pressure were recorded at one minute intervals during testing. When the total sampling time was reached the final gas stream temperature, probe vacuum pressure and opacity reading were recorded and the vacuum pumps turned off. The sampling probes were then removed from the gas stream and the final dry gas meter readings were recorded. The atomizer drive, blower, water supply pump, and the diesel pump were then turned off.

The filters were removed from the filter holders and placed in their respective petri dishes. They were then dried in an oven heated to 100° F. for one hour. After drying, they were removed and allowed to equilibrate to the lab temperature and humidity. The filters were then reweighed and the final weights were recorded.

It should be noted that the use of spray 114 was to presaturate and humidify the incoming air, so that the necessary evaporation would not cause some of the small, high-speed droplets in the scrubbing zone to evaporate completely, and thus become ineffective. Likewise, spray 122 was to keep the mist eliminator clean so that particles would not flake off and cause erroneous measurements of outlet particulate concentrations. The combined effect of low pressure (30 psi) sprays 114 and 122 contributed little or nothing to the actual levels of particulate removal achieved in the scrubber of the present invention. Specifically the percentage submicron particulate removal achieved with sprays 114 and 122 alone was in the range from 5% to 15%, and was never observed to exceed 20%.

Results

The weight gain on the filter was calculated by subtracting the initial from the final weight. The actual volume of air sampled was converted to a standard volume (60° F., 29.92 inches of Hg) based on the sampled gas stream temperature and probe vacuum pressure. The particulate concentration in the gas stream is reported as grains/SCF. The collection efficiency is the difference between the inlet and outlet particulate concentrations divided by the inlet concentration and reported as a percentage.

The results of forty tests using the screentype hub of the prior art are set forth in Table 1. The highest collection efficiency (88.5%) was observed in Test No. 6, and only six of the forty tests achieved greater than 80% collection efficiency.

The collection efficiency observed was generally superior to that observed under similar conditions with the screen-type hub. In particular, the solid annular hub has improved performance at higher hub/tube ratios. At a hub/tube ratio of 0.5, the solid hub achieves an average

TABLE 1

Tests Using Screen-Type Hub

| Test No. | Screen dia./width | Tube Dia. | Screen/ Tube | Screen RPM | Liq. GPM | Gas SCFM | Liq./ Gas[1] | Inlet gr/SCF | Outlet gr/SCF | Removal | Opacity In/Out |
|---|---|---|---|---|---|---|---|---|---|---|---|
| 1 | 9 in/1.0 in | 24 | 0.38 | 8000 | 30 | 2000 | 15 | 0.0400 | 0.0165 | 58.8 | — |
| 2 | " | " | " | " | " | " | " | 0.2127 | 0.0521 | 75.5 | 65/41 |
| 3 | " | " | " | 6000 | " | " | " | 0.1976 | 0.0577 | 70.8 | 63/45 |
| 4 | " | " | " | " | 60 | " | 30 | 0.2215 | 0.0702 | 68.3 | 62/47 |
| 5 | 9 in/0.5 in | " | " | 8000 | 30 | " | 15 | 0.2228 | 0.0517 | 76.8 | 64/40 |
| 6 | " | " | " | " | " | " | " | 0.2130 | 0.0245 | 88.5 | 65/39 |
| 7 | " | " | " | " | " | " | " | 0.2473 | 0.0497 | 79.9 | 63/40 |
| 8 | " | " | " | " | " | " | " | 0.1951 | 0.0519 | 73.4 | 62/40 |
| 9 | " | " | " | " | " | " | " | 0.2150 | 0.0647 | 69.9 | 63/45 |
| 10 | " | " | " | " | " | " | " | 0.1629 | 0.0549 | 66.3 | 64/39 |
| 11 | " | " | " | " | " | " | " | 0.1695 | 0.0412 | 75.7 | 59/33 |
| 12 | " | " | " | " | " | " | " | 0.2513 | 0.0563 | 77.6 | 61/40 |
| 13 | " | " | " | " | " | " | " | 0.2289 | 0.0625 | 72.7 | 61/40 |
| 14 | " | " | " | 9750 | 23 | " | 11.5 | 0.1430 | 0.0386 | 73.0 | 53/34 |
| 15 | " | " | " | " | " | " | " | 0.1685 | 0.0418 | 75.2 | 62/37 |
| 16 | " | " | " | " | 24 | " | 12 | 0.1826 | 0.0264 | 85.5 | 70/40 |
| 17 | " | " | " | " | " | " | " | 0.2116 | 0.0419 | 80.2 | 70/44 |
| 18 | " | " | " | " | " | " | " | 0.1645 | 0.0385 | 76.6 | 69/42 |
| 19 | " | " | " | " | " | " | " | 0.1701 | 0.0461 | 72.9 | 71/42 |
| 20 | " | 18 | 0.50 | " | " | " | " | 0.1776 | 0.0405 | 77.2 | 71/39 |
| 21 | " | " | " | " | " | " | " | 0.2958 | 0.0352 | 81.8 | — |
| 22 | " | " | " | 8000 | 35 | " | 17.5 | 0.2517 | 0.0745 | 70.4 | — |
| 23 | 9 in/0.4 in | " | " | " | 33 | " | 16.5 | 0.2449 | 0.0845 | 65.5 | — |
| 24 | " | " | " | " | " | " | " | 0.2203 | 0.0804 | 63.5 | — |
| 25 | " | " | " | " | " | " | " | 0.2300 | 0.0536 | 76.7 | — |
| 26 | 7 in/0.5 in | " | 0.39 | 9750 | " | " | " | 0.1873 | 0.0457 | 75.6 | — |
| 27 | " | " | " | " | " | " | " | 0.2024 | 0.0848 | 58.1 | — |
| 28 | " | " | " | " | " | " | " | 0.2011 | 0.0718 | 64.3 | — |
| 29 | " | " | " | " | " | " | " | 0.1971 | 0.0739 | 62.5 | — |
| 30 | " | " | " | " | " | " | " | 0.2314 | 0.0863 | 62.7 | — |
| 31 | 4.5/0.75 | 24 | 0.19 | 13500 | 35 | " | 17.5 | 0.1752 | 0.0860 | 50.9 | — |
| 32 | " | 18 | 0.25 | " | " | " | " | 0.1554 | 0.0676 | 56.5 | — |
| 33 | " | " | " | " | " | " | " | 0.2221 | 0.0804 | 63.8 | — |
| 34 | " | " | " | 11000 | " | " | " | 0.2136 | 0.0861 | 59.7 | — |
| 35 | 7.0/0.44 | " | 0.39 | 13500 | 20 | " | 10.0 | 0.2136 | 0.0534 | 75.0 | 74/39 |
| 36 | " | " | " | 12000 | " | " | " | 0.2389 | 0.0580 | 75.7 | 72/42 |
| 37 | " | " | " | " | " | " | 11.0 | 0.1599 | 0.0219 | 86.3 | 72/40 |
| 38 | " | " | " | " | 22 | " | " | 0.1590 | 0.0512 | 67.8 | 72/42 |
| 39 | " | " | " | " | " | " | " | 0.2044 | 0.0374 | 81.7 | 73/41 |
| 40 | " | " | " | " | 27 | " | 13.5 | 0.2159 | 0.0596 | 72.4 | 74/40 |

[1] Liq./Gas is expressed as gpm/MSCFM

Table 2 sets forth the results of 48 tests performed with the preferred solid annular hub of the present invention. The highest collection efficiency 96.7%) was observed in Test No. 43, and eighteen of the forty-eight tests achieved a collection efficiency greater than 90%.

collection efficiency of 85.8% compared to 72.5% for the screen-type hub. The data in Table 2, however, indicate that the highest collection efficiencies were obtained at hub/tube ratios of 0.61 and 0.69, respectively.

TABLE 2

Tests Using Solid Core Hub

| Test[1] No. | Hub (in.) | Hub/ Tube[2] | Hub RPM | Liq. GPM | Gas SCFM | Liq./ Gas[3] | Inlet gr/SCF | Outlet gr/SCF | Removal | Opacity In/Out |
|---|---|---|---|---|---|---|---|---|---|---|
| 1 | 7 | 0.39 | 12000 | 25 | 2000 | 12.5 | 0.2186 | 0.0483 | 77.9 | 74/35 |
| 2 | " | " | 13500 | 18 | 2000 | 9.0 | 0.2013 | 0.0459 | 77.2 | 74/46 |
| 3 | " | " | " | " | 2000 | " | 0.2318 | 0.0452 | 80.5 | 75/42 |
| 4 | " | " | " | " | 2000 | " | 0.1938 | 0.0434 | 77.6 | 74/38 |
| 5 | " | " | " | " | 2000 | " | 0.1602 | 0.0274 | 82.9 | 75/42 |
| 6 | " | " | " | " | 2000 | " | 0.1407 | 0.0377 | 73.2 | 74/35 |
| 7 | 9 | 0.50 | 12000 | 16 | 2000 | 8.0 | 0.2179 | 0.0255 | 88.3 | 73/30 |
| 8 | " | " | " | " | 2000 | " | 0.1764 | 0.0254 | 85.6 | 73/30 |
| 9 | " | " | " | 13.6 | 2000 | 6.8 | 0.1754 | 0.0342 | 80.5 | 70/35 |
| 10 | " | " | " | 18.2 | 2000 | 9.1 | 0.1746 | 0.0227 | 87.0 | 71/32 |
| 11 | " | " | 13500 | 15 | 2000 | 7.5 | 0.2000 | 0.0222 | 88.9 | 73/36 |
| 12 | " | " | " | " | 2000 | " | 0.1990 | 0.0195 | 90.2 | 74/38 |
| 13 | " | " | " | 10 | 2000 | 5.0 | 0.1677 | 0.0322 | 80.8 | 68/36 |
| 14 | " | " | " | 15 | 2000 | 7.5 | 0.1263 | 0.0096 | 92.4 | 58/31 |
| 15 | " | " | " | " | 2000 | " | 0.2326 | 0.0421 | 81.9 | 73/31 |
| 16 | " | " | " | " | 2000 | " | 0.0921 | 0.0129 | 86.0 | 58/31 |
| 17 | " | " | " | " | 2000 | " | 0.1091 | 0.0191 | 82.5 | 59/27 |

TABLE 2-continued

Tests Using Solid Core Hub

| Test[1] No. | Hub (in.) | Hub/ Tube[2] | Hub RPM | Liq. GPM | Gas SCFM | Liq./ Gas[3] | Inlet gr/SCF | Outlet gr/SCF | Removal | Opacity In/Out |
|---|---|---|---|---|---|---|---|---|---|---|
| 18 | 11.0 | 0.61 | 12000 | 11 | 2000 | 5.5 | 0.1135 | 0.0177 | 84.4 | 59/35 |
| 19 | " | " | " | 12 | 2000 | 6.0 | 0.1568 | 0.0232 | 85.2 | 59/37 |
| 20 | " | " | 11000 | 14.2 | 2000 | 7.2 | 0.2075 | 0.0222 | 89.3 | 63/28 |
| 21 | " | " | " " | " " | 2000 | " | 0.1141 | 0.0097 | 91.5 | 63/27 |
| 22 | " | " | " " | " " | 2000 | " | 0.0990 | 0.0096 | 90.3 | 63/28 |
| 23 | " | " | " " | " " | 2000 | " | 0.1124 | 0.0190 | 83.1 | 60/29 |
| 24 | " | " | " | 15 | 2000 | 7.5 | 0.1115 | 0.0097 | 91.3 | 59/25 |
| 25 | " | " | " " | " " | 2000 | " | 0.1381 | 0.0174 | 87.4 | 61/28 |
| 26 | " | " | " " | " " | 2000 | " | 0.0478 | 0.0022 | 95.4 | 29/11 |
| 27 | " | " | " " | " " | 2000 | " | 0.0545 | 0.0073 | 86.6 | 29/15 |
| 28 | " | " | " " | " " | 2000 | " | 0.0439 | 0.0040 | 90.9 | 29/21 |
| 29 | " | " | " " | " " | 2000 | " | 0.0525 | 0.0031 | 94.1 | 29/16 |
| 30 | 12.5 | 0.69 | 8200 | 21.6 | 2000 | 10.8 | 0.0468 | 0.0058 | 87.6 | 30/24 |
| 31 | " | " | " " | " " | 2000 | " | 0.0537 | 0.0088 | 83.6 | 30/22 |
| 32 | " | " | " " | " " | 2000 | " | 0.1700 | 0.0136 | 92.0 | 59/35 |
| 33 | " | " | " " | " " | 2000 | " | 0.1525 | 0.0093 | 93.9 | 60/39 |
| 34 | " | " | 10200 | 12 | 2000 | 6.0 | 0.1339 | 0.0154 | 88.5 | 56/42 |
| 35 | " | " | " | 15 | 2000 | 7.5 | 0.1464 | 0.0123 | 91.6 | 58/41 |
| 36 | " | " | " " | " " | 2000 | " | 0.1243 | 0.0092 | 92.6 | 56/40 |
| 37 | " | " | 6100 | 43 | 2000 | 21.5 | 0.1315 | 0.0309 | 76.5 | 57/45 |
| 38 | " | " | " " | " " | 2000 | " | 0.1395 | 0.0247 | 82.3 | 58/41 |
| 39 | " | " | 9000 | 14 | 2000 | 7.0 | 0.1224 | 0.0093 | 92.4 | 58/41 |
| 40 | " | " | " " | " " | 2000 | " | 0.1282 | 0.0091 | 92.9 | 60/43 |
| 41 | 11.0 | 0.61 | 10500 | 13.6 | 2000 | 6.8 | 0.1653 | 0.0119 | 92.8 | 63/35 |
| 42 | " | " | " " | " " | 2000 | " | 0.1773 | 0.0195 | 89.0 | 64/38 |
| 43 | " | " | 9000 | 17.6 | 2000 | 8.8 | 0.1576 | 0.0052 | 96.7 | 60/37 |
| 44 | " | " | " " | " " | 2000 | " | 0.1559 | 0.0106 | 93.2 | 60/38 |
| 45 | 12.5 | 0.69 | 12000 | 7.2 | 2000 | 3.6 | 0.1500 | 0.0081 | 94.6 | 61/45 |
| 46 | 14.0 | 0.78 | 10800 | 6.4 | 2000 | 3.2 | 0.1513 | 0.0351 | 76.8 | 58/46 |
| 47 | " | " | 8200 | 13.6 | 2000 | 6.8 | 0.1531 | 0.0222 | 85.5 | 59/39 |
| 48 | " | " | 6100 | 27.4 | 2000 | 13.7 | 0.1614 | 0.0447 | 72.3 | 60/45 |

[1]Tests 1-4 were performed without spray in nozzles 114 or 122; tests 5, 6 and 37 employed spray in nozzles 114 only; and the remainder employed spray in both nozzles 114 and 122.
[2]Tube diameter was 18 inches for all tests.
[3]Liq./Gas is expressed as gpm/MSCFM.

Figure 9:
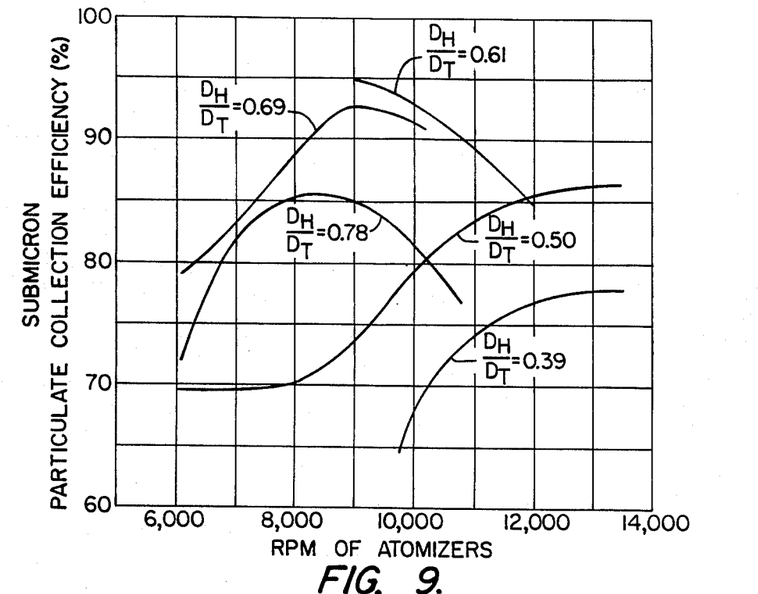
FIG. 9 is a graph of particulate collection efficiency as a function of hub RPM for several hub/tube diameter ratios.
Figure 10:
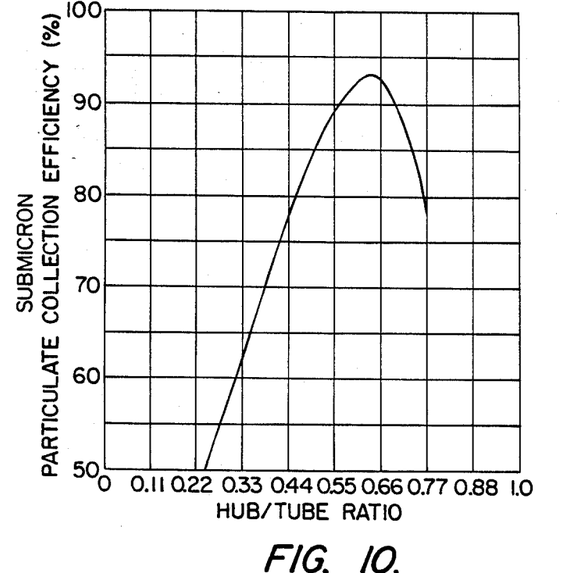
FIG. 10 is a graph of particulate collection efficiency as a function of hub/tube diameter ratio.

The data from Table 2 were used to construct the graphs of FIGS. 9 and 10. FIG. 9 plots submicron collection efficiency against hub RPM for the different hub/tube diameter ratios. It is apparent that the higher hub/tube ratios achieve a higher collection efficiency than that achieved by smaller hub/tube ratios. Moreover, each curve appears to reach a maximum at a particular RPM value.

FIG. 10 depicts collection efficiency as a function of hub/tube ratio for an 18 inch tube at a hub speed of 10,500 RPM. The collection efficiency peaks at a value of about 93%, corresponding to a hub/tube ratio of about 0.63. Collection efficiencies above 90% are achieved at hub/tube ratios between about 0.57 and 0.70.

Although the foregoing invention has been described in detail by way of illustration and example, it will be appreciated by those skilled in the art that certain modifications and variations may be made without departing from what is regarded to be the invention as set forth in the following claims.

What is claimed is:

1. A method for scrubbing particulates from an air stream, said method employing a rotary spray scrubber including:
   a substantially cylindrical duct which defines an axial flow path for the air stream;
   a rotating dispersion hub having a substantially solid radial face rotatably mounted in the duct, said hub including a circular periphery having a plurality of radial passages;
   wherein the cylindrical duct and the hub together define an annular passage therebetween, and wherein the ratio of the hub diameter to the duct diameter at said annular passage is in the range from about 0.55 to 0.75;
   said method comprising:
   rotating the hub at a preselected rotational speed corresponding to a tangential hub velocity of at least about 500 ft/sec;
   supplying liquid scrubbing medium to the passages in the hub so that a radial spray of droplets having a diameter of from 10 to 50 microns is directed to the annular passage between the hub and the duct; and
   directing the air stream flow through the annular passage whereby the radial spray impacts the particulates to remove them from the air stream.

2. A method as in claim 1 wherein the liquid scrubbing medium is supplied to the hub at a pressure below about 25 psi.

3. A method as in claim 1 wherein the liquid scrubbing to gas flowrate ratio is in the range from 5 to 10 gpm/MCFM.

4. An improved rotary spray scrubber of the type including a generally cylindrical duct for directing a flow of particulate-laden gas in substantially an axial direction and a rotating dispersion device for directing a generally radial spray of a liquid scrubbing medium into the gas flow to impact and remove the particulates, said improved scrubber characterized by:
   a rotating dispersion hub having a generally circular periphery and a substantially solid radial face covering the entire area within the periphery, said periphery including passages for directing a plurality of radial streams of the scrubbing medium when the hub is rotated and the medium is supplied to the passages;

means for mounting and rotating the hub so that its axis of rotation lies generally along the center line of the duct; and means for supplying the scrubbing medium to the passages in the hub;

wherein the ratio of the peripheral diameter of the hub to the diameter of the duct proximate the hub is in the range from about 0.55 to 0.75 and the duct has a diameter from about 10 to 48 inches, whereby an annular passage is defined between the periphery of the hub and the interior of the duct.

5. An improved rotary spray scrubber as in claim 4, wherein the rotating dispersion hub includes from about 16 to 32 passages each having a diameter in the range from about 1/16 to 5/16 inches.

6. An improved rotary spray scrubber as in claim 4, wherein the duct diameter proximate the hub is defined by a constriction which is in the range from 95 to 90% of the upstream duct diameter.

7. An improved rotary spray scrubber as in claim 4, wherein the hub comprises a first radial plate having a hole at its center, a second radial plate spaced-apart from the first radial plate, and an annular wall therebetween which defines the circular periphery of the hub; said first radial plate, second radial plate and annular wall together defining a chamber which receives scrubbing medium through the hole in the first plate from said scrubbing medium-supplying means.

8. An improved rotary spray scrubber as in claim 7, wherein the annular wall is at least about one inch thick and said passages therethrough are substantially radial so that energy is imparted so the scrubbing medium as the hub is rotated.

* * * * *